T. R. DOUGHERTY.
NAILLESS DETACHABLE HORSESHOE.
APPLICATION FILED APR. 18, 1912.
1,068,989.
Patented July 29, 1913.
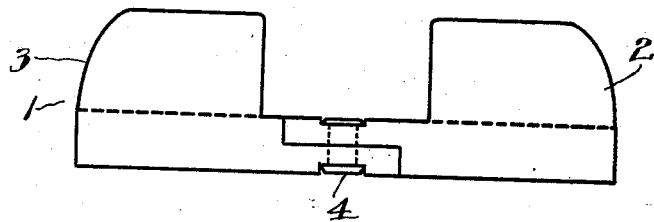
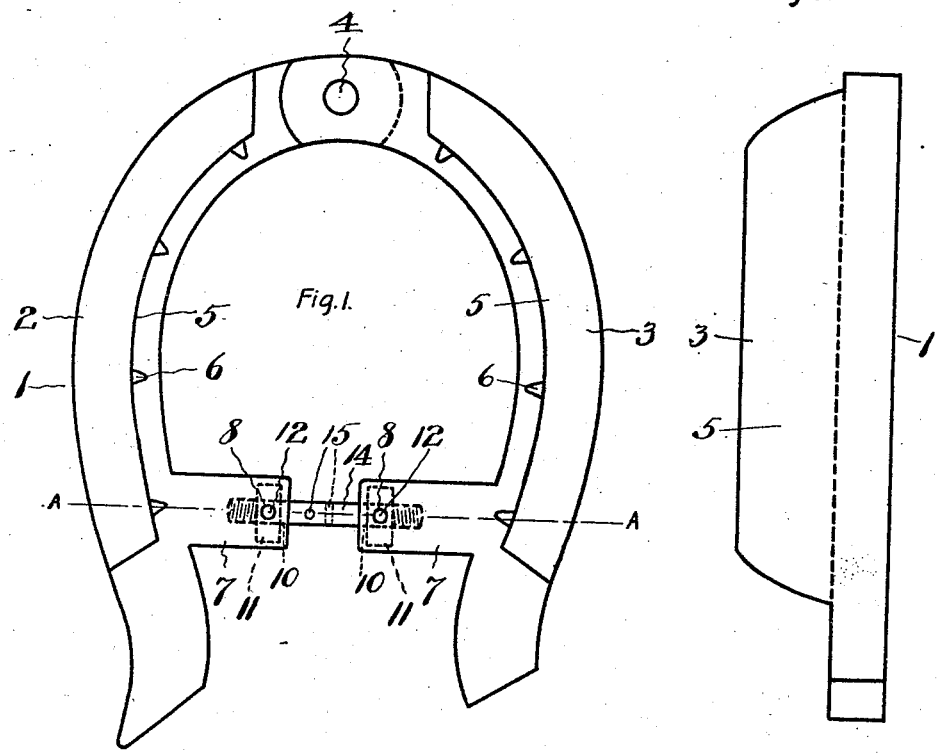
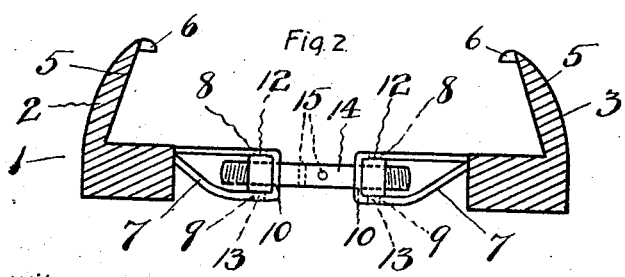

UNITED STATES PATENT OFFICE.

THOMAS R. DOUGHERTY, OF HIBBING, MINNESOTA.

NAILLESS DETACHABLE HORSESHOE.

1,068,989.  Specification of Letters Patent.  Patented July 29, 1913.

Application filed April 18, 1912. Serial No. 691,758.

*To all whom it may concern:*

Be it known that I, THOMAS R. DOUGHERTY, a citizen of the United States, residing at Hibbing, in the county of St. Louis, State of Minnesota, have invented certain new and useful Improvements in Nailless Detachable Horseshoes, and do declare the following to be a full, clear, and exact description of the invention, such as will enable others skilled in the art to which it pertains to make and use the same.

My invention relates to an improvement in horse shoes and more particularly to a nailless detachable horse shoe.

The object of the invention is to provide a horse shoe which can be quickly and easily applied and removed without requiring the services of a blacksmith.

Another object is to provide a horse shoe which can be applied to the hoof of a horse without the use of nails, thereby avoiding the constant damage and mutilation caused to the hoofs of the horse by the driving and drawing of nails through the same.

A further object is to provide a horse shoe which is capable of being adjusted to fit hoofs of varying sizes.

A still further object is to provide a horse shoe which is inexpensive, durable and simple in construction, easy to apply and very effective in use.

Referring to the drawings:—Figure 1, is a top plan view of a horse shoe constructed in accordance with my invention. Fig. 2, a cross-section, on the line A—A. Fig. 3, a side view. Fig. 4, a front view.

In the drawings, in which like numerals of reference denote like parts throughout the several views, 1 represents the horse shoe which may be made of steel, iron, bronze, white metal or any other suitable material, and comprises two curved clamping sections 2 and 3, pivotally connected, at their forward ends, by means of a pin or rivet 4 and each of said sections is provided with an upwardly and inwardly inclined flange 5 having a series of inwardly projecting pointed lugs 6. Each of the two curved clamping sections is provided with a laterally inwardly projecting hollow lug 7 having upper and lower holes 8 and 9, respectively, and lateral holes 10. Internally threaded square nuts 11 are mounted in the hollow portions of the hollow lugs 7, each having upper and lower pins 12 and 13, respectively, which engage and are seated in the upper and lower holes 8 and 9, respectively, of the hollow lugs of the curved clamping sections and are thereby prevented from turning.

The sections of the horse shoe are adjusted laterally, to fit hoofs of various sizes, by means of a bolt 14 having right and left hand screwthreads, said bolt having its ends passed through the lateral holes 10 and engaging the screwthreads of the nuts 11, holes 15 being provided through the central portion of the bolt for the purpose of receiving a pin, key or other instrument with which to turn or operate the nut to adjust the two sections of the horse shoe.

In applying the horse shoe it is only necessary to place the horse's hoof between the sections and then by operating the bolt cause said sections to move toward each other and clamp the hoof securely therein.

I do not desire to be understood as limiting myself to the specific details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variations and modifications as properly fall within the scope of my invention and the terms of the following claim.

What I claim is:

In a horseshoe, hinged sections having hollow lugs provided with vertical holes and horizontal holes, nuts provided with pins engaging the vertical holes, by which they are held stationary within said lugs, and a screwthreaded bolt passing through said horizontal holes and engaging the nuts and having its ends inclosed by said lugs, substantially as described.

THOMAS R. DOUGHERTY.

Witnesses:
S. C. SCOTT,
LUCY GORMAN.

Copies of this patent may be obtained for five cents each, by addressing the "Commissioner of Patents, Washington, D. C."